UNITED STATES PATENT OFFICE.

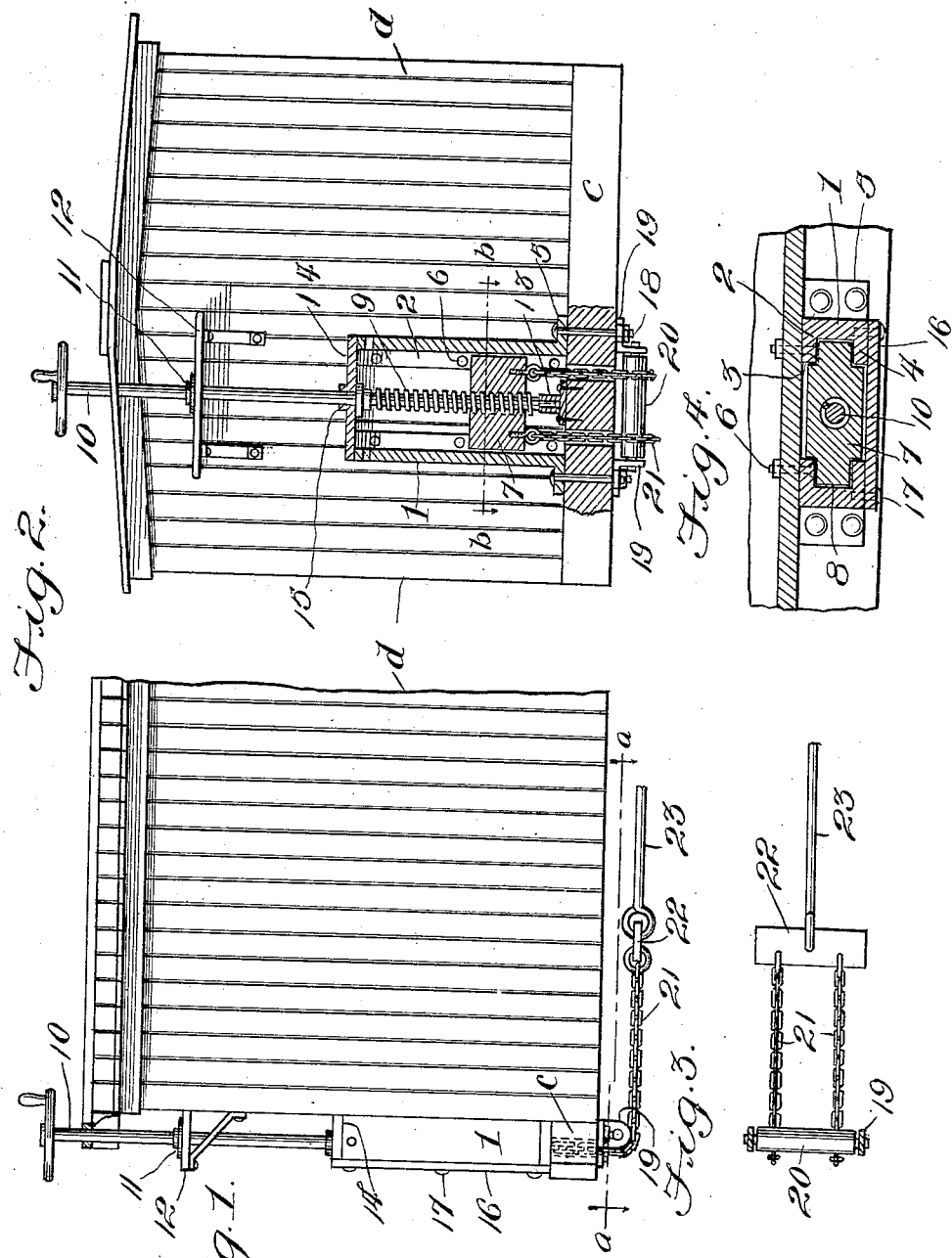

NATHAN ELLIOTT, OF KILSYTH, WEST VIRGINIA.

BRAKE-OPERATING APPARATUS FOR RAILWAY-CARS.

No. 917,569.   Specification of Letters Patent.   Patented April 6, 1909.

Application filed April 24, 1908. Serial No. 428,981.

*To all whom it may concern:*

Be it known that I, NATHAN ELLIOTT, a citizen of the United States, residing at Kilsyth, in the county of Fayette and State of West Virginia, have invented new and useful Improvements in Brake-Operating Apparatus for Railway-Cars, of which the following is a specification.

This invention relates to improvements in brake operating apparatus for railway cars, and the said invention consists in the construction, combination and arrangement of devices hereinafter described and claimed.

In the accompanying drawings, Figure 1 is an elevation of one end of the body of a freight car provided with brake operating apparatus constructed in accordance with my invention. Fig. 2 is an end elevation of the car, with parts of the brake operating apparatus in section. Fig. 3 is a detail plan and partly a section on the plane indicated by the line $a$—$a$ of Fig. 1. Fig. 4 is a detail horizontal sectional view on the plane indicated by the line $b$—$b$ of Fig. 2.

In accordance with my invention, I provide a pair of uprights 1 which form the sides of a casing and the inner sides of which are formed with guide grooves 2 providing inner flanges 3 and outer flanges 4. At the lower ends of the said uprights are outwardly extending flanges or feet 5 which serve to bear upon and are bolted to the bumper sill $c$ at the end of the car body $d$. The inner flanges 3 of the said uprights are secured to the end of the car as by means of bolts 6. A follower block 7 is disposed between the uprights and provided at its ends with guide flanges 8 which travel and fit in the guide grooves or ways 2 of the uprights. Said follower block is provided with a vertical centrally disposed screw threaded opening which is engaged by the screw threaded lower end 9 of a brake operating shaft 10 which extends to and above the top of the car and has a bearing 11 on a stop 12 at the end of the car. The lower end of the said shaft is reduced and is stepped in a bearing 13 which is secured on the bumper sill at a point midway between the uprights 1. A cover plate 14 is placed on the upper ends of the said uprights and is provided with a bearing 15 for the said brake operating shaft. A front plate 16, which coöperates with the cover plate and the uprights to form a housing for the follower block and the screw threaded lower portion of the shaft 10 is bolted to the outer sides of the said uprights as at 17.

Under the bumper sill and secured thereto by the bolts 18 which are employed to secure the uprights 1 are angle plates 19 which are provided with bearings for the spindles at the ends of a roller 20. Chains 21 pass through vertical openings in the bumper sill and have their upper ends secured to the follower block at points near the ends of said follower block. Said chains engage the roller 20 and pass rearwardly therefrom and have their rear or inner ends connected to an evener 22 to which is attached the usual brake rod 23 which operates the usual brake lever, (not shown), the said brake rod being attached to the center of the said evener.

It will be understood from the foregoing and from reference to the drawings that by turning the shaft 10 in one direction the screw threaded portion thereof will cause the follower block to move upwardly and thereby draw the brake rod 23 longitudinally toward the end of the car so as to apply the brakes. By turning the said shaft in the reverse direction, the follower block will be caused by the screw threaded portion of the shaft to move downwardly so as to slacken the chains 21 and release the brakes. It will be understood that no means whatever is necessary to lock the shaft 10 when the latter has been turned to apply the brakes as the friction between the screw threaded portions of such shaft and the follower block will prevent such shaft from casually turning when the brakes are applied. It will also be understood that the housing in which the follower block and screw threaded portion of the shaft are mounted serves to protect said screw threaded portion of the shaft and such follower block from the elements so that they are prevented from rusting and they are also prevented from being clogged as by ice or snow.

Having thus described the invention, what I claim as new and desire to secure by Letters Patent is:—

1. Brake apparatus for railway cars comprising a pair of uprights forming the sides of a casing, having guide grooves on their inner sides and provided at their lower ends with feet to bear on the bumper sill of a car, a cover plate on the upper ends of said uprights and having a bearing opening, a front plate coöperating with the cover plate and the uprights to complete the casing, a follower block in said casing between said uprights and engaging the guide grooves of said uprights, a bearing at the lower end of said casing, a shaft mounted in said bearing and in the bearing opening of the cover plate and having a screw threaded portion extending through a threaded opening in the follower block and means to connect the follower block to a brake element.

2. Railway car having a bumper sill at one end, a pair of guide uprights at said end of the car, mounted on the bumper sill and having feet bearing thereon, a follower block between and guided by said uprights, a bearing on said bumper sill between said guide uprights, a shaft having its lower end mounted in said bearing and provided with a screw threaded portion engaging a threaded opening in said follower, angle plates on the under side of said bumper sill, bolts engaging the feet of the guide uprights, extending through said bumper sill and also engaging said angle plates and serving to secure the latter as well as the guide uprights to the bumper sill, a direction element having its bearings in said angle plates and flexible connections between the follower block and the brake element, said flexible connection engaging said direction element.

In testimony whereof I affix my signature in presence of two witnesses.

NATHAN ELLIOTT.

Witnesses:
JOHN S. SNYDER,
JOE ELLIOTT.